US006528561B1

(12) United States Patent
Zobel et al.

(10) Patent No.: US 6,528,561 B1
(45) Date of Patent: Mar. 4, 2003

(54) FLAME-RESISTANT POLYCARBONATE ABS BLENDS

(75) Inventors: Michael Zobel, Köln (DE); Thomas Eckel, Dormagen (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/069,660

(22) PCT Filed: Aug. 22, 2000

(86) PCT No.: PCT/EP00/08163

§ 371 (c)(1),
(2), (4) Date: Feb. 27, 2002

(87) PCT Pub. No.: WO01/18105

PCT Pub. Date: Mar. 15, 2001

(30) Foreign Application Priority Data

Sep. 2, 1999 (DE) .......................................... 199 41 821

(51) Int. Cl.$^7$ ................................................. C08K 5/53
(52) U.S. Cl. ........................ 524/125; 524/100; 524/117; 524/127; 524/700
(58) Field of Search ................................ 524/125, 127, 524/100, 700, 117

(56) References Cited

U.S. PATENT DOCUMENTS

| | | | |
|---|---|---|---|
| 3,505,431 A | 4/1970 | Birum | 260/932 |
| 3,711,577 A | 1/1973 | Maier | 260/932 |
| 4,054,544 A | 10/1977 | Albright | 260/2.5 AJ |
| 4,073,767 A | 2/1978 | Birum | 260/45.8 R |
| 4,397,750 A | 8/1983 | Chibnik | 252/51.5 A |
| 5,061,745 A | 10/1991 | Wittmann et al. | 524/139 |
| 5,204,394 A | 4/1993 | Gosen et al. | 524/125 |
| 5,276,066 A | 1/1994 | Paulik et al. | 521/108 |
| 5,525,651 A | * 6/1996 | Ogoe et al. | 523/436 |
| 5,578,666 A | 11/1996 | Weil et al. | 524/100 |
| 5,650,464 A | 7/1997 | Brunner et al. | 524/700 |
| 5,672,645 A | 9/1997 | Eckel et al. | 524/127 |
| 5,844,028 A | 12/1998 | Paulik | 524/117 |
| 6,031,031 A | * 2/2000 | Weber et al. | 524/95 |
| 6,069,206 A | * 5/2000 | Nishihara et al. | 525/282 |
| RE36,902 E | 10/2000 | Eckel et al. | 524/127 |

FOREIGN PATENT DOCUMENTS

| | | |
|---|---|---|
| EP | 0 594 553 | 4/1994 |
| FR | 1371139 | 8/1964 |

* cited by examiner

Primary Examiner—Terressa M. Boykin
(74) Attorney, Agent, or Firm—Joseph C. Gil; Aron Preis

(57) ABSTRACT

The present invention relates to polycarbonate-ABS moulding compositions provided with phosphonate amines, which moulding compositions exhibit excellent flame protection and very good processing properties, such as improved flow properties, improved modulus of elasticity and reduced formation of a coating on the tool, the graft polymer being prepared by means of mass, solution or mass-suspension polymerization processes.

12 Claims, No Drawings

FLAME-RESISTANT POLYCARBONATE ABS BLENDS

The present invention relates to polycarbonate-ABS moulding compositions provided with phosphonate amines, which moulding compositions exhibit excellent flame protection and very good processing properties, the graft polymer being prepared by means of mass, solution or mass-suspension polymerisation processes.

U.S. Pat. Nos. 4,073,767 and 5,844,028 describe cyclic phosphorus compounds including phosphorinane rings as suitable flameproofing agents for polyurethanes, polycarbonates, polyesters and polyamides. In U.S. Pat. No. 4,397,750, particular cyclic phosphonate esters are described as efficient flameproofing agents for polypropylene and other polyolefins. U.S. Pat. Nos. 5,276,066 and 5,844,028 describe particular (1,3,2-dioxaphosphorinanemethane)-amines which are suitable flameproofing agents for polyurethanes, polyesters, styrene polymers, PVC, PVAc or polycarbonate.

U.S. Pat. No. 3,505,431, French Patent 1 371 139, U.S. Pat. Nos. 3,711,577, 4,054,544 describe acyclic triphosphonate amines, some of which are halogenated.

EP-A 0 640 655 describes moulding compositions of aromatic polycarbonate, styrene-containing copolymers and graft polymers, which moulding compositions can be rendered flame-resistant with monomeric and/or oligomeric phosphorus compounds.

In EP-A 0 363 608, flame-resistant polymer mixtures of aromatic polycarbonate, styrene-containing copolymer or graft copolymer and oligomeric phosphates are described as flameproofing additives. For some applications, such as, for example, mouldings inside casing parts, the dimensional stability of those mixtures under heat is often inadequate.

In U.S. Pat. No. 5,061,745, polymer mixtures of aromatic polycarbonate, ABS graft polymer and/or styrene-containing copolymer and monophosphates are described as flameproofing additives. The level of resistance of those mixtures to stress cracking is often inadequate for the production of thin-walled casing parts.

The object of the present invention is to provide polycarbonate/ABS blends having excellent flame resistance and excellent processing properties, such as improved flow properties, improved modulus of elasticity and reduced formation of a coating on the tool during the processing operation. That spectrum of properties is required especially in the case of applications in the field of data technology, such as, for example, for casings for monitors, printers, copiers, etc.

It has now been found that PC/ABS moulding compositions containing phosphonate amine in combination with graft polymer based on a diene rubber and prepared by means of mass, solution or mass-suspension polymerisation processes exhibit the desired properties.

Accordingly, the invention provides blends containing
A) from 40 to 99 parts by weight, preferably from 60 to 98.5 parts by weight, of aromatic polycarbonate and/or polyester carbonate,
B) from 0.5 to 60 parts by weight, preferably from 1 to 40 parts by weight, particularly preferably from 2 to 25 parts by weight, of graft polymer, prepared by means of mass, solution or mass-suspension polymerisation processes, of
  B.1) from 50 to 99 wt. %, preferably from 65 to 98 wt. %, of one or more vinyl monomers with
  B.2) from 50 to 1 wt. %, preferably from 35 to 2 wt. %, of one or more graft bases having a glass transition temperature <10° C., preferably <0° C., particularly preferably <−10° C.,
C) from 0 to 45 parts by weight, preferably from 0 to 30 parts by weight, particularly preferably from 2 to 25 parts by weight, of at least one thermoplastic polymer selected from the group of the vinyl (co)polymers and polyalkylene terephthalates,
D) from 0.1 to 30 parts by weight, preferably from 1 to 25 parts by weight, particularly preferably from 2 to 20 parts by weight, of phosphonate amine of formula (I)

in which
A represents a radical of formula (IIa)

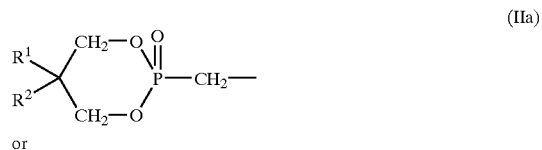

or

$R^1$ and $R^2$ are each independently of the other unsubstituted or substituted $C_1$–$C_{10}$-alkyl or unsubstituted or substituted $C_6$–$C_{10}$-aryl,
$R^3$ and $R^4$ are each independently of the other unsubstituted or substituted $C_1$–$C_{10}$-alkyl or unsubstituted or substituted $C_6$–$C_{10}$-aryl, or
$R^3$ and $R^4$ together represent unsubstituted or substituted $C_3$–$C_{10}$-alkylene,
y represents the numerical values 0, 1 or 2, and
the substituents B are each independently hydrogen, optionally halogenated $C_2$–$C_8$-alkyl, unsubstituted or substituted $C_6$–$C_{10}$-aryl,
E) from 0 to 5 parts by weight, preferably from 0.1 to 3 parts by weight, particularly preferably from 0.1 to 1 part by weight, most particularly preferably from 0.1 to 0.5 part by weight, of fluorinated polyolefin.

Component A

Aromatic polycarbonates and/or aromatic polyester carbonates which are suitable according to the invention as component A are known in the literature or can be prepared by processes which are known in the literature (for the preparation of aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; for the preparation of aromatic polyester carbonates see, for example, DE-OS 3 077 934).

The preparation of aromatic polycarbonates is carried out, for example, by reacting diphenols with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using branching agents having a functionality of three or more, for example triphenols or tetraphenols.

Diphenols for the preparation of aromatic polycarbonates and/or aromatic polyester carbonates are preferably those of formula (III)

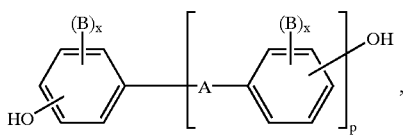

(III)

wherein
  A represents a single bond, $C_1$–$C_5$-alkylene, $C_2$–$C_5$-alkylidene, $C_5$–$C_6$-cycloalkylidene, —O—, —SO—, —CO—, —S—, —SO$_2$—, $C_6$–$C_{12}$-arylene, to which there may be condensed other aromatic rings optionally containing hetero atoms,
  or a radical of formula (IV) or (V)

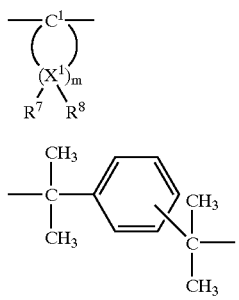

(IV)

(V)

each of the substituents B represents $C_1$–$C_{12}$-alkyl, preferably methyl, halogen, preferably chlorine and/or bromine,
  the substituents x are each independently of the other 0, 1 or 2,
  p represents 1 or 0, and
    $R^7$ and $R^8$ can be selected individually for each $X^1$ and are each independently of the other hydrogen or $C_1$–$C_6$-alkyl, preferably hydrogen, methyl or ethyl,
    $X^1$ represents carbon, and
    m represents an integer from 4 to 7, preferably 4 or 5, with the proviso that at at least one atom $X^1$, $R^7$ and $R^8$ are simultaneously alkyl.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)ethers, bis-(hydroxyphenyl)sulfoxides, bis-(hydroxyphenyl)ketones, bis-(hydroxyphenyl)-sulfones and α,α-bis-(hydroxyphenyl)-diisopropylbenzenes and their derivatives brominated and/or chlorinated at the ring.

Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone and their di- and tetra-brominated or -chlorinated derivatives, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

Special preference is given to 2,2-bis-(4-hydroxyphenyl)-propane (bisphenol A).

The diphenols may be used individually or in the form of any desired mixtures.

The diphenols are known in the literature or obtainable by processes known in the literature.

Suitable chain terminators for the preparation of thermoplastic aromatic polycarbonates are, for example, phenol, p-chlorophenol, p-tert.-butylphenol or 2,4,6-tribromophenol, as well as long-chained alkylphenols, such as 4-(1,3-tetramethylbutyl)-phenol according to DE-OS 2 842 005 or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally from 0.5 mol. % to 10 mol. %, based on the molar sum of the diphenols used in a particular case.

The thermoplastic aromatic polycarbonates have mean weight-average molecular weights ($M_w$, measured, for example, by means of an ultracentrifuge or by scattered-light measurement) of from 10,000 to 200,000, preferably from 20,000 to 80,000.

The thermoplastic aromatic polycarbonates may be branched in a known manner, preferably by the incorporation of from 0.05 to 2.0 mol. %, based on the sum of the diphenols used, of compounds having a functionality of three or more, for example compounds having three or more phenolic groups.

Both homopolycarbonates and copolycarbonates are suitable. For the preparation of copolycarbonates according to the invention as component A, from 1 to 25 wt. %, preferably from 2.5 to 25 wt. % (based on the total amount of diphenols to be used) of polydiorganosiloxanes having hydroxy-aryloxy terminal groups may also be used. Those compounds are known (see, for example, U.S. Pat. No. 3,419,634) or can be prepared by processes known in the literature. The preparation of copolycarbonates containing polydiorganosiloxanes is described, for example in DE-OS 3 334 782.

In addition to the homopolycarbonates of bisphenol A, preferred polycarbonates are the copolycarbonates of bisphenol A containing up to 15 mol. %, based on the molar sum of diphenols, of diphenols other than those mentioned as being preferred or particularly preferred, especially 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid.

Special preference is given to mixtures of the diacid dichlorides of isophthalic acid and terephthalic acid in a ratio of from 1:20 to 20:1.

In the preparation of polyester carbonates, a carbonic acid halide, preferably phosgene, is additionally used concomitantly as bifunctional acid derivative.

In addition to the monophenols already mentioned, there come into consideration as chain terminators for the preparation of the aromatic polyester carbonates also the chlorocarbonic acid esters of the mentioned monophenols and the acid chlorides of aromatic monocarboxylic acids, which may optionally be substituted by $C_1$–$C_{22}$-alkyl groups or by halogen atoms, as well as aliphatic $C_2$–$C_{22}$-monocarboxylic acid chlorides.

The amount of chain terminators is in each case from 0.1 to 10 mol. %, based in the case of phenolic chain terminators on moles of diphenols and in the case of monocarboxylic acid chloride chain terminators on moles of dicarboxylic acid dichlorides.

The aromatic polyester carbonates may also contain aromatic hydroxycarboxylic acids incorporated therein.

The aromatic polyester carbonates may be either linear or branched in a known manner (see in that connection also DE-OS 2 940 024 and DE-OS 3 007 934).

There may be used as branching agents, for example, carboxylic acid chlorides having a functionality of three or more, such as trimesic acid trichloride, cyanuric acid trichloride, 3,3'-4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis-(4,4'-dihydroxy-triphenyl)-methyl]-benzene, in amounts of from 0.01 to 1.0 mol. %, based on diphenols used. Phenolic branching agents can be used initially with the diphenols, acid chloride branching agents can be introduced together with the acid dichlorides.

The content of carbonate structural units in the thermoplastic aromatic polyester carbonates can vary as desired. The carbonate group content is preferably up to 100 mol. %, especially up to 80 mol. %, particularly preferably up to 50 mol. %, based on the sum of ester groups and carbonate groups. Both the esters and the carbonates contained in the aromatic polyester carbonates can be present in the polycondensation product in the form of blocks or in a randomly distributed manner.

The relative solution viscosity ($\eta_{rel}$) of the aromatic polycarbonates and polyester carbonates is in the range of from 1.18 to 1.4, preferably from 1.22 to 1.3 (measured on solutions of 0.5 g of polycarbonate or polyester carbonate in 100 ml of methylene chloride solution at 25° C.).

The thermoplastic aromatic polycarbonates and polyester carbonates may be used alone or in any desired mixture with one another.

Component B

The rubber-modified graft polymer B consists of a random (co)polymer of monomers according to B.1.1 and B.1.2, as well as a rubber B.2 grafted with the random (co)polymer of monomers according to B.1.1 and B.1.2, B being prepared in a known manner by means of a mass or solution polymerisation process or a mass-suspension polymerisation process, as described, for example, in U.S. Pat. Nos. 3,243,481, 3,509,237, 3,660,535, 4,221,833 and 4,239,863.

Examples of monomers B.1.1 are styrene, α-methylstyrene, styrenes substituted at the ring by halogen or by alkyl, such as p-methylstyrene, p-chlorostyrene, (meth)acrylic acid $C_1$–$C_8$-alkyl esters, such as methyl methacrylate, n-butyl acrylate and tert.-butyl acrylate. Examples of monomers B.1.2 are unsaturated nitriles, such as acrylonitrile, methacrylonitrile, (meth)acrylic acid $C_1$–$C_8$-alkyl esters, such as methyl methacrylate, n-butyl acrylate, tert.-butyl acrylate, derivatives (such as anhydrides and imides) of unsaturated carboxylic acids, such as maleic anhydride and N-phenyl maleimide, or mixtures thereof.

Preferred monomers B.1.1 are styrene, α-methylstyrene and/or methyl methacrylate; preferred monomers B.1.2 are acrylonitrile, maleic anhydride and/or methyl methacrylate.

Particularly preferred monomers are B.1.1 styrene and B.1.2 acrylonitrile. Suitable rubbers B.2 for the rubber-modified graft polymers B are, for example, diene rubbers, EP(D)M rubbers, that is to say those based on ethylene/propylene and optionally diene, acrylate, polyurethane, silicone, chloroprene and ethylene/vinyl acetate rubbers.

Preferred rubbers B.2 are diene rubbers (for example based on butadiene, isoprene, etc.) or mixtures of diene rubbers or copolymers of diene rubbers or mixtures thereof with other copolymerisable monomers (for example according to B.1.1 and B.1.2), with the proviso that the glass transition temperature of component B.2 is below 10° C., preferably below −10° C. Special preference is given to pure polybutadiene rubber.

Component B may, if required, and if the rubber properties of component B.2 are not impaired as a result, additionally contain small amounts, usually less than 5 wt. %, preferably less than 2 wt. %, based on B.2, of ethylenically unsaturated monomers having crosslinking action. Examples of such monomers having crosslinking action are alkylenediol di(meth)acrylates, polyester di(meth)acrylates, divinylbenzene, trivinylbenzene, triallyl cyanurate, allyl (meth)acrylate, diallyl maleate and diallyl fumarate.

The rubber-modified graft polymer B is obtained by graft polymerisation of from 50 to 99 parts by weight, preferably from 65 to 98 parts by weight, particularly preferably from 75 to 97 parts by weight, of a mixture of from 50 to 99 parts by weight, preferably from 60 to 95 parts by weight, of monomers according to B.1.1 and from 1 to 50 parts by weight, preferably from 5 to 40 parts by weight, of monomers according to B.1.2 in the presence of from 1 to 50 parts by weight, preferably from 2 to 35 parts by weight, particularly preferably from 2 to 15 parts by weight, most particularly preferably from 2 to 13 parts by weight, of the rubber component B.2, the graft polymerisation being carried out according to a mass or solution polymerisation process or a mass-suspension polymerisation process.

In the preparation of the rubber-modified graft polymers B it is important that, prior to the graft polymerisation, the rubber component B.2 be present in dissolved form in the mixture of the monomers B.1.1 and B.1.2. Therefore, the rubber component B.2 must not be so greatly crosslinked that a solution in B.1.1 and B.1.2 becomes impossible, nor must B.2 already be present in the form of discrete particles at the beginning of the graft polymerisation. The particle morphology and the increasing crosslinking of B.2, which are important for the product properties of B, only develop in the course of the graft polymerisation (see in that connection, for example, Ullmann, Encyclopadie der technischen Chemie, Volume 19, p. 284 et seq., 4th edition 1980).

The random copolymer of B.1.1 and B.1.2 is usually present in the polymer B partly grafted onto or into the rubber B.2, the graft mixed polymer forming discrete particles in the polymer B. The content of grafted-on or -in copolymer of B.1.1 and B.1.2 in the total copolymer of B.1.1 and B.1.2—that is to say the graft yield (=weight ratio of the actually grafted graft monomers to the total graft monomers used×100, given in %)—should be from 2 to 40%, preferably from 3 to 30%, particularly preferably from 4 to 20%.

The mean particle diameter of the resulting grafted rubber particles (determined by counting on electron microscope images) is in the range from 0.5 to 5 $\mu$m, preferably from 0.8 to 2.5 $\mu$m.

Component C

Component C consists of one or more thermoplastic vinyl (co)polymers C.1 and/or polyalkylene terephthalates C.2.

Suitable as vinyl (co)polymers C.1 are polymers of at least one monomer from the group of the vinyl aromatic compounds, vinyl cyanides (unsaturated nitriles), (meth) acrylic acid ($C_1$–$C_8$)-alkyl esters, unsaturated carboxylic acids and derivatives (such as anhydrides and imides) of unsaturated carboxylic acids. Especially suitable are (co) polymers of C.1.1 from 50 to 99 parts by weight, preferably from 60 to 80 parts by weight, of vinyl aromatic compounds and/or vinyl aromatic compounds substituted at the ring (such as, for example, styrene, α-methylstyrene, p-methylstyrene, p-chlorostyrene) and/or methacrylic acid ($C_1$–$C_8$)-alkyl esters (such as, for example, methyl methacrylate, ethyl methacrylate), and C.1.2 from 1 to 50 parts by weight, preferably from 20 to 40 parts by weight, of vinyl cyanides (unsaturated nitriles), such as acrylonitrile and methacrylonitrile, and/or (meth)acrylic acid ($C_1$–$C_8$)-alkyl esters (such as, for example, methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenyl maleimide).

The (co)polymers C.1 are resin-like, thermoplastic and rubber-free.

Special preference is given to the copolymer of C.1.1 styrene and C.1.2 acrylonitrile.

The (co)polymers according to C.1 are known and can be prepared by free-radical polymerisation, especially by emulsion, suspension, solution or mass polymerisation. The (co)polymers preferably have molecular weights $\overline{M}_w$ (weight average, determined by light scattering or sedimentation) of from 15,000 to 200,000.

The polyalkylene terephthalates of component C.2 are reaction products of aromatic dicarboxylic acids or reactive derivatives thereof, such as dimethyl esters or anhydrides, and aliphatic, cycloaliphatic or araliphatic diols, and mixtures of those reaction products.

Preferred polyalkylene terephthalates contain at least 80 wt. %, preferably at least 90 wt. %, based on the dicarboxylic acid component, of terephthalic acid radicals and at least 80 wt. %, preferably at least 90 mol. %, based on the diol component, of ethylene glycol and/or 1,4-butanediol radicals.

The preferred polyalkylene terephthalates may contain, in addition to terephthalic acid radicals, up to 20 mol. %, preferably up to 10 mol. %, of radicals of other aromatic or cycloaliphatic dicarboxylic acids having from 8 to 14 carbon atoms or of aliphatic dicarboxylic acids having from 4 to 12 carbon atoms, such as, for example, radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexane-diacetic acid.

The preferred polyalkylene terephthalates may contain, in addition to ethylene glycol or 1,4-butanediol radicals, up to 20 mol. %, preferably up to 10 mol. %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxyphenyl)-propane and 2,2-bis-(4-hydroxypropoxyphenyl)-propane (DE-OS 2 407 674, 2 407 776, 2 715 932).

The polyalkylene terephthalates can be branched by the incorporation of relatively small amounts of tri- or tetra-hydric alcohols or tri- or tetra-basic carboxylic acids, for example according to DE-OS 1 900 270 and U.S. Pat. No. 3,692,744. Examples of preferred branching agents are trimesic acid, trimellitic acid, trimethylolethane, trimethylolpropane and pentaerythritol.

Special preference is given to polyalkylene terephthalates which have been prepared solely from terephthalic acid and reactive derivatives thereof (for example dialkyl esters thereof) and ethylene glycol and/or 1,4butanediol, and mixtures of those polyalkylene terephthalates.

Mixtures of polyalkylene terephthalates contain from 1 to 50 wt %, preferably from 1 to 30 wt. %, of polyethylene terephthalate and from 50 to 99 wt. %, preferably from 70 to 99 wt. %, of polybutylene terephthalate.

The polyalkylene terephthalates which are preferably used generally have an intrinsic viscosity of from 0.4 to 1.5 dl/g, preferably from 0.5 to 1.2 dl/g, measured in phenol/o-dichlorobenzene (1:1 parts by weight) at 25° C. using an Ubbelohde viscometer.

The polyalkylene terephthalates can be prepared by known methods (see, for example, Kunststoff-Handbuch, Volume VIII, p. 695 et seq., Carl-Hanser-Verlag, Munich 1973).

Component D

The moulding compositions according to the invention contain as flameproofing agent at least one phosphonate amine compound of formula (I)

in which

A represents

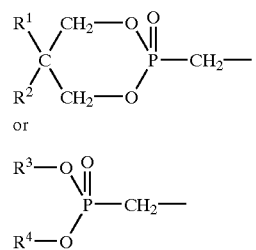

wherein $R^1$, $R^2$, $R^3$ and $R^4$ and B and y are as defined above.

The substituents B, each independently, are preferably hydrogen; ethyl, n-propyl or isopropyl, each of which may be substituted by halogen; $C_6$–$C_{10}$-aryl, especially phenyl or naphthyl, which is unsubstituted or substituted by $C_1$–$C_4$-alkyl and/or by halogen.

Alkyl in $R^1$, $R^2$, $R^3$ and $R^4$, each independently of the others, is preferably methyl, ethyl, n-propyl, isopropyl, n-butyl, isobutyl, sec.-butyl, tert.-butyl, pentyl or hexyl.

Substituted alkyl in $R^1$, $R^2$, $R^3$ and $R^4$, each independently of the others, is preferably $C_1$–$C_{10}$-alkyl substituted by halogen, especially mono- or di-substituted methyl, ethyl, n-propyl, isopropyl, n-butyl, isobutyl, sec.-butyl, tert.-butyl, pentyl or hexyl.

R³ and R⁴, together with the carbon atom to which they are bonded, preferably form cyclopentyl, cyclohexyl, cycloheptyl or cyclooctyl, especially cyclopentyl or cyclohexyl.

$C_6$–$C_{10}$-Aryl in R¹, R², R³ and R⁴, each independently of the others, is preferably phenyl, naphthyl or binaphthyl, especially o-phenyl, o-naphthyl, o-binaphthyl, each of which may be substituted (generally mono-, di- or tri-substituted) by halogen.

The following are mentioned by way of preferred examples: 5,5,5',5',5",5"-hexamethyl-tris(1,3,2-dioxaphosphorinane-methane)amine-2,2',2"-trioxide of formula (I-1)

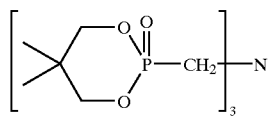

(I-1)

(test product XPM 1000, Solutia Inc., St. Louis, USA)

1,3,2-dioxaphosphorinane-2-methaneamine, N-butyl-N[(5,5-dimethyl-1,3,2-dioxaphosphorinan-2-yl)methyl]-5,5-dimethyl-, P,2-dioxides; 1,3,2-dioxaphosphorinane-2-methaneamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methaneamine, N,N-dibutyl-5,5-dimethyl-, 2-oxide, 1,3,2-dioxaphosphorinane-2-methaneimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methaneamine, N-butyl-N-[(5,5-dichloromethyl-1,3,2-dioxaphosphorinan-2-yl)-methyl]-5,5-di-chloromethyl-, P,2-dioxide, 1,3,2-dioxaphosphorinane-2-methaneamine, N-[(5,5-di-chloromethyl-1,3,2-dioxaphosphorinan-2-yl)methyl]-5,5-di-chloromethyl-N-phenyl-, P,2-dioxide; 1,3,2-dioxaphosphorinane-2-methaneamine, N,N-di-(4-chlorobutyl)-5,5-dimethyl-2-oxides; 1,3,2-dioxaphosphorinane-2-methaneimine, N-[(5,5-dimethyl-1,3,2-dioxaphosphorinan-2-yl)-methane]-N-(2-chloroethyl)-5,5-di(chloromethyl)-, P,2-dioxide.

Also preferred are:
compounds of formula (I-2) or (I-3)

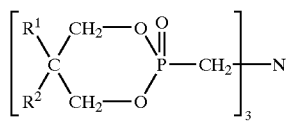

(I-2)

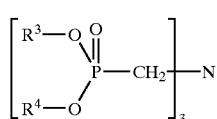

(I-3)

wherein
R¹, R², R³ and R⁴ are as defined above.

Compounds of formulae (I-2), (I-1) are particularly preferred. The individual compounds mentioned above are also particularly preferred.

The compounds of formula (I) can be prepared by the following processes:

a) PCl₃ is added to a mixture of 1,3-diol derivatives, water and an organic solvent at a temperature of from 10 to 60° C., yielding a 5,5-disubstituted 1,3,2-dioxaphosphorinane 2-oxide of formula (Ia)

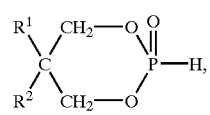

(Ia)

wherein R¹ and R² are as defined above;

b) after purification, the 1,3,2-dioxaphosphorinane 2-oxide is reacted in paraformaldehyde with an amine $B_yNH_{3-y}$, wherein B and y are as defined above;

c) after further purification and drying, the phosphonate amine of formula (I) is obtained.

A detailed description of the preparation process can be found in U.S. Pat. No. 5,844,028.

Component E

The fluorinated polyolefins E have a high molecular weight and have glass transition temperatures above −30° C., generally above 100° C., fluorine contents of preferably from 65 to 76 wt. %, especially from 70 to 76 wt. %, and mean particle diameters $d_{50}$ of from 0.05 to 1000 µm, preferably from 0.08 to 20 µm. In general, the fluorinated polyolefins E have a density of from 1.2 to 2.3 g/cm³. Preferred fluorinated polyolefins E are polytetrafluoroethylene, polyvinylidene fluoride, tetrafluoroethylene/hexafluoropropylene and ethylene/tetrafluoroethylene copolymers. The fluorinated polyolefins are known (see "Vinyl and Related Polymers" by Schildknecht, John Wiley & Sons, Inc., New York, 1962, pages 484–494; "Fluorpolymers" by Wall, Wiley-Interscience, John Wiley & Sons, Inc., New York, Volume 13, 1970, pages 623–654; "Modern Plastics Encyclopedia", 1970–1971, Volume 47, No. 10 A, October 1970, McGraw-Hill, Inc., New York, pages 134 and 774; "Modern Plastics Encyclopedia", 1975–1976, October 1975, Volume 52, No. 10 A, McGraw-Hill, Inc., New York, pages 27, 28 and 472; and U.S. Pat. Nos. 3,671,487, 3,723,373 and 3,838,092).

They can be prepared by known processes, for example by polymerisation of tetrafluoroethylene in an aqueous medium with a catalyst that forms free radicals, for example sodium, potassium or ammonium peroxydisulfate, at pressures of from 7 to 71 kg/cm² and at temperatures of from 0 to 200° C., preferably at temperatures of from 20 to 100° C. (For further details see, for example, U.S. Pat. No. 2,393,967.) Depending on the form in which they are used, the density of those materials may be from 1.2 to 2.3 g/cm³ and the mean particle size may be from 0.5 to 1000 µm.

Preferred fluorinated polyolefins E according to the invention are tetrafluoroethylene polymers having a mean particle diameter of from 0.05 to 20 µm, preferably from 0.08 to 10 µm, and a density of from 1.2 to 1.9 g/cm³.

E.1) in the form of a coagulated mixture with at least one of components A to C, the fluorinated polyolefin E or polyolefin mixture being mixed in the form of an emulsion with at least one emulsion of components A to C and subsequently being coagulated; or E.2) in the form of a pre-compound with at least one of components A to C, the fluorinated polyolefins E being mixed in the form of a powder with a powder or a granulate of at least one of components A to C and being compounded in the melt, generally at temperatures of from 208° C. to 330° C., in conventional devices such as internal kneaders, extruders or double-shaft screws.

Preferred preparations for the fluorinated polyolefins E are coagulated mixtures with a graft polymer B or a vinyl (co)polymer C.

Suitable fluorinated polyolefins E which can be used in powder form are tetrafluoroethylene polymers having a mean particle diameter of from 100 to 1000 μm and densities of from 2.0 g/cm³ to 2.3 g/cm³.

For the preparation of a coagulated mixture of a graft polymer B and component E, an aqueous emulsion (latex) of a graft polymer is first mixed with a finely divided emulsion of a tetrafluoroethylene polymer E; suitable tetrafluoroethylene polymer emulsions usually have solids contents of from 30 to 70 wt. %, especially from 50 to 60 wt. %, preferably from 30 to 35 wt. %.

The amount indicated in the description of components A, B and C does not contain the amount of graft polymer, vinyl (co)polymer or polycarbonate for the coagulated mixture according to E.1) and E.2).

In the emulsion mixture, the equilibrium ratio of graft polymer 3 or (co)polymer to fluorinated polyolefin E is from 95:5 to 60:40, preferably from 90:10 to 50:50. The emulsion mixture is subsequently coagulated in a known manner, for example by spray drying, lyophilisation or coagulation by the addition of inorganic or organic salts, acids, bases or organic, water-miscible solvents, such as alcohols, ketones, preferably at temperatures of from 20 to 150° C., especially from 50 to 100° C. If necessary, drying can be carried out at from 50 to 200° C., preferably from 70 to 100° C.

Suitable tetrafluoroethylene polymer emulsions are commercially available products and are sold, for example, by DuPont as Teflon® 30 N.

The moulding compositions according to the invention may contain at least one of the conventional additives, such as lubricating and mould-release agents, nucleating agents, antistatics, stabilisers as well as colourings and pigments.

The moulding compositions according to the invention may contain up to 35 wt. %, based on the total moulding composition, of a further flameproofing agent optionally having a synergistic action. There are mentioned as examples of further flameproofing agents organic halogen compounds, such as decabromobisphenyl ether, tetrabromobisphenol, inorganic halogen compounds, such as ammonium bromide, nitrogen compounds, such as melamine, melamine-formaldehyde resins, inorganic hydroxide compounds, such as magnesium and aluminium hydroxide, inorganic compounds, such as antimony oxides, hydroxoantimonate, zirconium oxide, zirconium hydroxide, molybdenum oxide, ammonium molybdate, zinc borate, ammonium borate, barium metaborate, talc, silicate, silicon dioxide and tin oxide as well as siloxane compounds.

Also suitable as flameproofing agents are phosphorus compounds of formula (VI)

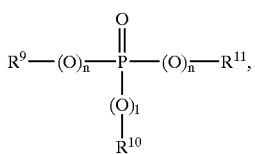

(VI)

in which
  $R^9$, $R^{10}$ and $R^{11}$ are each independently of the others an optionally halogenated $C_1$–$C_8$-alkyl or an optionally halogenated and/or alkylated $C_5$- or $C_6$-cycloalkyl or an optionally halogenated and/or alkylated and/or aralkylated $C_6$–$C_{30}$-aryl, and "n" and "l" are each independently of the other 0 or 1.

Those phosphorus compounds are generally known (see, for example, Ullmann, Enzyklopadie der technischen Chemie, Volume 18, pages 301 et seq., 1979 and EP-A 345 522). The aralkylated phosphorus compounds are described, for example, in DE-OS 38 24 356.

Optionally halogenated $C_1$–$C_8$-alkyl radicals according to (VI) may be mono- or poly-halogenated, linear or branched. Examples of alkyl radicals are chloroethyl, 2-chloropropyl, 2,3-dibromopropyl, butyl, methyl or octyl.

Optionally halogenated and/or alkylated $C_5$- or $C_6$-cycloalkyl radicals according to (VI) are optionally mono- to poly-halogenated and/or alkylated $C_5$- or $C_6$-cycloalkyl radicals, that is to say, for example, cyclopentyl, cyclohexyl, 3,3,5-trimethylcyclohexyl and fully chlorinated cyclohexyl.

Optionally halogenated and/or alkylated and/or aralkylated $C_6$–$C_{30}$-aryl radicals according to (VI) are optionally mono- or poly-nuclear, mono- or poly-halogenated and/or alkylated and/or aralkylated, for example chlorophenyl, bromophenyl, pentachlorophenyl, pentabromophenyl, phenyl, cresyl, isopropylphenyl, benzyl-substituted phenyl and naphthyl.

$R^9$, $R^{10}$ and $R^{11}$, each independently of the others, are preferably methyl, ethyl, butyl, octyl, phenyl, cresyl, cumyl or naphthyl. $R^9$, $R^{10}$ and $R^{11}$, each independently of the others, are particularly preferably methyl, ethyl, butyl, optionally methyl- and/or ethyl-substituted phenyl.

Phosphorus compounds of formula (VI) which can be used according to the invention are, for example, tributyl phosphate, tris-(2-chloroethyl)phosphate, tris(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl)phosphate, tris-(p-benzylphenyl) phosphate, triphenylphosphine oxide, methanephosphonic acid dimethyl esters, methanephosphonic acid diphenyl esters and phenylphosphonic acid diethyl esters.

Suitable flameproofing agents are also dimeric and oligomeric phosphates, as described, for example, in EP-A-O 363 608.

The moulding compositions according to the invention can contain as flameproofing agents phosphorus compounds according to formula (VII)

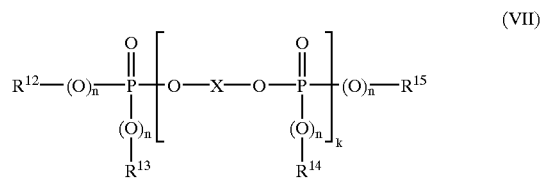

(VII)

In the formula, $R^{12}$, $R^{13}$, $R^{14}$ and $R^{15}$ are each independently of the others $C_1$–$C_8$-alkyl, $C_5$–$C_6$-cycloalkyl, $C_6$–$C_{20}$-aryl or $C_7$–$C_{12}$-aralkyl, each of which is optionally halogenated.

Preferably, $R^{12}$, $R^{13}$, $R^{14}$ and $R^{15}$ are each independently of the others $C_1$–$C_4$-alkyl, phenyl, naphthyl or phenyl-$C_1$–$C_4$-alkyl. The aromatic groups $R^{12}$, $R^{13}$, $R^{14}$ and $R^{15}$ may in turn be substituted by halogen and/or alkyl groups, preferably chlorine, bromine and/or $C_1$–$C_4$-alkyl. Particularly preferred aryl radicals are cresyl, phenyl, xylenyl, propylphenyl or butylphenyl and the corresponding brominated and chlorinated derivatives thereof.

X in formula (VII) represents a mono- or poly-nuclear aromatic radical having from 6 to 30 carbon atoms. It is preferably derived from diphenols of formula (I). Diphenylphenol, bisphenol A, resorcinol or hydroquinone or their chlorinated or brominated derivatives are particularly preferred.

each of the substituents n in formula (VII), independently of the others, may be 0 or 1; n is preferably 1.

k represents values from 0 to 30, preferably an average value of from 0.3 to 20, particularly preferably from 0.5 to 10, especially from 0.5 to 6.

There may also be used mixtures of from 10 to 90 wt. %, preferably from 12 to 40 wt. %, of at least one monophosphorus compound of formula (VI) and at least one oligomeric phosphorus compound or of a mixture of oligomeric phosphorus compounds as described in EP-A-363 608 and phosphorus compounds according to formula (VII) in amounts of from 10 to 90 wt. %, preferably from 60 to 88 wt. %, based on the total amount of phosphorus compounds.

Monophosphorus compounds of formula (VI) are especially tributyl phosphate, tris-(2-chloroethyl)phosphate, tris-(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl)phosphate, halo-substituted aryl phosphates, methylphosphonic acid dimethyl esters, methylphosphonic acid diphenyl esters, phenylphosphonic acid diethyl esters, triphenylphosphine oxide or tricresylphosphine oxide.

The mixtures of monomeric and oligomeric phosphorus compounds of formula (VII) have average k values of from 0.3 to 20, preferably from 0.5 to 10, especially from 0.5 to 6.

The mentioned phosphorus compounds are known (see, for example, EP-A-363 608, EP-A-640 655) or can be prepared according to known methods in an analogous manner (for example, Ullmanns Encyklopadie der technischen Chemie, Vol. 18, p. 301 et seq., 1979; Houben-Weyl, Methoden der organischen Chemie, Vol. 12/1, p. 43; Beilstein Vol. 6, p. 177).

The moulding compositions according to the invention containing components A to E and, optionally, other known additives, such as stabilisers, colourings, pigments, lubricating and mould-release agents, nucleating agents and antistatics, are produced by mixing the constituents in question in a known manner and melt-compounding and melt-extruding the mixture at temperatures of from 200° C. to 300° C. in conventional devices such as internal kneaders, extruders and double-shaft screws, component E preferably being used in the form of the coagulated mixture mentioned above.

The individual constituents may be mixed in a known manner either in succession or simultaneously, either at approximately 20° C. (room temperature) or at a higher temperature.

Accordingly, the present invention also provides a process for producing the moulding compositions.

On account of their excellent flame resistance and their good mechanical properties, the thermoplastic moulding compositions according to the invention are suitable for the production of moulded bodies of any kind, especially those having increased requirements as regards processing properties.

Such moulded bodies include parts of complex construction having a plurality of gate marks, and thin-walled casing parts having wall thicknesses of <2 mm, especially <1.5 mm.

The moulding compositions of the present invention can be used in the production of moulded bodies of any kind. In particular, moulded bodies can be produced by injection moulding. Examples of moulded bodies which can be produced are: casing parts of any kind, for example for domestic appliances such as juice extractors, coffee machines, mixers, for office equipment such as monitors, printers, copiers, or covering plates for the construction sector and parts for the motor vehicle sector. They can also be used in the field of electrical engineering because they have very good electrical properties.

The moulding compositions according to the invention can also be used, for example, for producing the following moulded bodies or mouldings: parts for finishing the interior of track vehicles, hub caps, casings for electrical appliances containing small transformers, casings for devices for distributing and transmitting information, casings and coverings for medical purposes, massage devices and casings therefor, toy vehicles for children, flat prefabricated wall panels, casings for security devices, rear spoilers, heat-insulated transport containers, device for keeping or caring for small animals, mouldings for sanitary and bathroom fittings, grids for covering ventilation openings, mouldings for garden and tool sheds, and casings for gardening tools.

Another form of processing is the production of moulded bodies by deep-drawing from previously prepared sheets or films, Accordingly, the present invention relates also to the use of the moulding compositions according to the invention in the production of moulded bodies of any kind, preferably of those mentioned above, and to the moulded bodies produced from the moulding compositions according to the invention.

EXAMPLES

Component A

Linear polycarbonate based on bisphenol A, having a relative solution viscosity of 1.26, measured in $CH_2Cl_2$ as solvent at 25° C. and at a concentration of 0.5 g/100 ml.

Component B

B.1 Graft polymer of 40 parts by weight of a copolymer of styrene and acrylonitrile in a ratio of 73:27 with 16 parts by weight of crosslinked polybutadiene rubber, prepared by mass polymerisation.

B.2 Comparison

Graft polymer of 40 parts by weight of a copolymer of styrene and acrylonitrile in a ratio of 73:27 with 60 parts by weight of particulate, crosslinked polybutadiene rubber (mean particle size $d_{50}=0.28$ μm), prepared by emulsion polymerisation.

Component C

Styrene/acrylonitrile copolymer having a styrene/acrylonitrile weight ratio of 72:28 and an intrinsic viscosity of 0.55 dl/g (measurement in dimethylformamide at 20° C.).

Component D

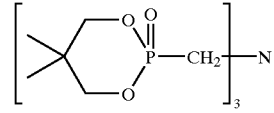

(XPM 1000 development product, Solutia Inc., Gl. Louis, Mo.)

Component E

Batch of SAN and Teflon in a weight ratio of 1:1 (Blendex®446, General Electric, N.Y., USA).

Pentaerythritol tetrastearate is used as the mould-release agent.

Production and Testing of the Moulding Compositions according to the invention

The components are mixed using a 3 litre internal kneader. The moulded bodies are produced using an Arburg 270 E injection moulding machine at 260° C.

The dimensional stability under heat according to Vicat B is determined in accordance with DIN 53 460 (ISO 306) using rods measuring 80×10×4 mm.

The stress cracking behaviour (ESC behaviour) was tested on rods measuring 80×10×4 mm, processing temperature 260° C. The test medium used was a mixture of 60 vol. % toluene and 40 vol. % isopropanol. The test specimens were pre-expanded by means of a circular are template (pre-extension in percent) and stored in the test medium at room temperature. The stress cracking behaviour was evaluated in the test medium via the crack formation or the fracture in dependence on the pre-extension.

MVR measurement (240/5) [cm³/10 min] is carried out according to ISO 1133.

The tensile modulus is determined according to DIN 53 457/ISO 527.

Thermogravimetric analysis (TGA) was used as a measure of the formation of a coating on the tool. The loss in weight of the mixtures was determined under $N_2$ as inert gas in a temperature range from 0 to 400° C. with a heating rate of 10 K/min. For evaluation, the loss in weight at a temperature of 280° C., which corresponds to usual processing temperatures, was used. The higher the numerical value, the greater the tendency towards coating formation during the processing operation. Lower values indicate a lesser tendency towards coating formation.

TABLE

Moulding compositions and their properties (amounts are in parts by weight)

| Example | 1 | 2 (comparison) |
|---|---|---|
| Components | | |
| A | 67.67 | 67.60 |
| B1 | 19.27 | — |
| B2 | — | 10.50 |
| C | — | 8.80 |
| D | 11.86 | 11.90 |
| E | 0.8 | 0.80 |
| Mould-release agent | 0.4 | 0.40 |
| Vicat B120 (° C.) | 119 | 116 |
| UL94 3.2 mm | V0 | V0 |
| MVR (240/5), ISO 1133 (cm³/10 min) | 17.8 | 12.2 |
| TGA Loss in weight at 280° C. (%) | 0.81 | 1.18 |
| Tensile test Modulus of elasticity N/mm² | 2622 | 2474 |

The moulding compositions according to the invention are distinguished by an advantageous combination of flame protection and mechanical properties. In addition, it has surprisingly been found that the moulding compositions containing mass-ABS exhibit additional advantages in the field of processing properties. Both the flow properties (MVR) and the loss in weight which can be regarded as a measure of the coating formation that occurs on the tool under processing conditions, are markedly more advantageous (about 20%) than in the case of moulding compositions containing emulsion-ABS (Comparison Example 2).

What is claimed is:

1. Blends containing
A) from 40 to 99 parts by weight of aromatic polycarbonate and/or polyester carbonate,
B) from 0.5 to 60 parts by weight of graft polymer, prepared by means of mass, solution or mass-suspension polymerisation processes, of
B.1) from 50 to 99 wt. % of one or more vinyl monomers with
B.2) from 50 to 1 wt. % of one or more graft bases having a glass transition temperature <10° C.,
C) from 0 to 45 parts by weight of at least one thermoplastic polymer selected from the group of the vinyl (co)polymers and polyalkylene terephthalates,
D) from 0.1 to 30 parts by weight of a phosphonate amine

in which
A represents a radical of formula (IIa)

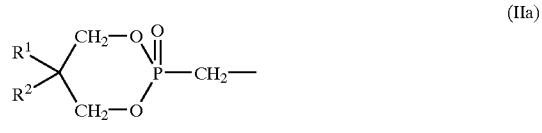

or

$R^1$ and $R^2$ are each independently of the other unsubstituted or substituted $C_1$–$C_{10}$-alkyl or unsubstituted or substituted $C_6$–$C_{10}$-aryl,
$R^3$ and $R^4$ are each independently of the other unsubstituted or substituted $C_1$–$C_{10}$-alkyl or unsubstituted or substituted $C_6$–$C_{10}$-aryl, or
$R^3$ and $R^4$ together represent unsubstituted or substituted $C_3$–$C_{10}$-alkylene,
y represents the numerical values 0, 1 or 2, and
the substituents B are each independently hydrogen, optionally halogenated $C_2$–$C_8$-alkyl, unsubstituted or substituted $C_6$–$C_{10}$-aryl,
E) from 0 to 5 parts by weight of fluorinated polyolefin.

2. Blends according to claim 1 containing
from 60 to 98.5 parts by weight of A
from 1 to 40 parts by weight of B
from 0 to 30 parts by weight of C
from 1 to 25 parts by weight of D and
from 0.1 to 3 parts by weight of E.

3. Blends according to claim 1 containing from 2 to 25 parts by weight of C.

4. Blends according to claim 1 containing from 2 to 20 parts by weight of D.

5. Blends according to claim 1 wherein vinyl monomers B.1 are mixtures of
B.1.1 styrene, α-methylstyrene, styrenes substituted at the ring by halogen or by alkyl, and/or (meth)acrylic acid $C_1$–$C_8$-alkyl esters and
B.1.2 unsaturated nitriles, (meth)acrylic acid $C_1$–$C_8$-alkyl esters and/or derivatives of unsaturated carboxylic acids.

6. Blends according to claim 1 wherein the graft base is at least one rubber selected from the group consisting of the diene rubbers, EP(D)M rubbers, acrylate, polyurethane, silicone, chloroprene and ethylene/vinyl acetate rubbers.

7. Blends according to claim 1 wherein phosphonate amine is at least one member selected from the group consisting of 5,5,5',5',5",5"-hexamethyl-tris(1,3,2-dioxaphosphorinane-methane)amine-2,2',2"-trioxide, 1,3,2-dioxaphosphorinane-2-methaneamine, N-butyl-N[(5,5-dimethyl-1,3,2-dioxaphosphorinan-2-yl)methyl]-5,5-dimethyl-, P,2-dioxides; 1,3,2-dioxaphosphorinane-2-methaneamine, N-[(5,5-dimethyl-1,3,2-dioxaphosphorinan-2-yl)methyl]-5,5-dimethyl-N-phenyl-, P,2-dioxide; 1,3,2-dioxaphosphorinane-2-methaneamine, N,N-dibutyl-5,5-dimethyl-, 2-oxide, 1,3,2-dioxaphosphorinane-2-methaneimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methaneamine, N-butyl-N-[(5,5-dichloromethyl-1,3,2-dioxaphosphorinan-2-yl )-methyl]-5,5-di-chloromethyl-, P,2-dioxide, 1,3,2-dioxaphosphorinane-2-methaneamine, N-[(5,5-di-chloromethyl-1,3,2-dioxaphosphorinan-2-yl)-methyl]-5,5-di-chloromethyl-N-phenyl-, P,2-dioxide; 1,3,2-dioxaphosphorinane-2-methaneamine, N,N-di-(4-chlorobutyl)-5,5-dimethyl-2-oxides; 1,3,2-dioxaphosphorinane-2-methaneimine and N-[(5,5-dimethyl-1,3,2-dioxaphosphorinan-2-yl)methane]-N-(2-chloroethyl)-5,5-di(chloromethyl)-, P,2-dioxide.

8. Blends according to claim 1 further containing at least one additive selected from the group consisting of the lubricating and mould-release agents, nucleating agents, antistatics, stabilisers, colourings and pigments.

9. Blends according to claim 1 containing further flame-proofing agents which are other than component D.

10. Process for producing moulding compositions of claim 1 wherein components A to E are mixed with other optional additives and melt-compounded.

11. Blends according to claim 1 wherein phosphonate amine conforms to the formula:

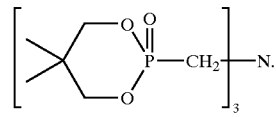

12. A molded article comprising the blend of claim 1.

* * * * *